United States Patent [19]

Rieth

[11] Patent Number: 4,992,491

[45] Date of Patent: Feb. 12, 1991

[54] CELLULOSE ESTER-COPOLYESTER ETHER BLENDS

[75] Inventor: John E. Rieth, Penfield, N.Y.

[73] Assignee: Eastman Kodak Company, Rochester, N.Y.

[21] Appl. No.: 319,441

[22] Filed: Mar. 6, 1989

[51] Int. Cl.$^5$ ............... C08L 1/00; C08L 1/14; C08L 1/08

[52] U.S. Cl. .................. 524/27; 524/39; 106/172

[58] Field of Search ............ 524/39, 27; 106/172

[56] References Cited

U.S. PATENT DOCUMENTS

| | | | |
|---|---|---|---|
| 2,607,704 | 8/1952 | Fordyce et al. | 106/89 |
| 3,023,192 | 2/1962 | Shivers | 528/300 |
| 3,484,339 | 12/1969 | Caldwell | 524/39 |
| 3,592,671 | 7/1971 | Malm et al. | 106/176 |
| 3,640,742 | 2/1972 | Touey et al. | 106/179 |
| 3,651,014 | 3/1972 | Witsiepe | 528/301 |
| 3,793,043 | 2/1974 | Dresie et al. | 106/194 |
| 3,922,239 | 11/1975 | Koleske et al. | 524/39 |
| 4,013,624 | 3/1977 | Hoeschele | 528/300 |
| 4,348,238 | 9/1982 | Krall | 106/177 |
| 4,349,469 | 9/1982 | Davis et al. | 524/765 |

FOREIGN PATENT DOCUMENTS 1431916 4/1976 United Kingdom .

OTHER PUBLICATIONS

"Textbook of Polymer Science by Fred W. Billmeyer, Jr. 2nd Ed.", pp. 382-384.

*Primary Examiner*—John Kight, III
*Assistant Examiner*—P. Hampton Hightower
*Attorney, Agent, or Firm*—Robert A. Gerlach

[57] ABSTRACT

A blend of a cellulose and up to 5 percent by weight of a polyesterether resin and photographic film base having improved tear strength prepared from the blend.

4 Claims, No Drawings

CELLULOSE ESTER-COPOLYESTER ETHER BLENDS

Background of the Invention

1. Field of the Invention

This invention relates to cellulose ester-copolyester ether blends and to photographic film base utilizing such blends. More particularly this invention relates to blends which yield film base having improved tear strength.

It is common practice in the manufacture of cellulose ester sheeting for photographic film base or for other uses to cast a film of a solution of the desired cellulose ester in a volatile solvent upon a casting wheel, belt or other surface, evaporate at least a portion of the volatile solvent and strip the sheeting from the casting wheel or surface. It is also known that the speed with which the casting surface can be moved through the casting zone depends directly on how quickly the sheeting can be drawn from the casting surface which in turns depends on how rapidly the film attains sufficient strength to be stripped. Two directions can be taken in order to reduce the time the film is required to remain on the casting surface and thus, the output of the casting operation. One is to modify the casting surface in order to reduce the forces between the casting surface and the cast film. The second is to modify the cellulose ester casting solution in order to enable as rapid removal from the casting surface as possible without destroying the nature of the cast film. With regard to the latter, various stripping aids have been incorporated into the cellulose ester solutions to aid stripping. Representative examples of such stripping aids are set forth in U.S. Pat. Nos. 2,275,716, 3,528,833, 3,793,043, and 4,348,238.

An additional problem with regard to cellulose ester film base is that the tear strength is not very high and therefore breaks can occur not only during the processing of the film base but subsequently thereto. Further, cellulose ester film base cannot be stretched or tentered as is the practice with regard to polyesters which can be stretched over 300%. Cellulose acetate, for example, can be stretched in width about 40%; however, this is accompanied by a drastic decrease in physical properties, for example, tear strength drops to unacceptable levels when such films are stretched 8 to 10%. Thus, an overall increase in dimensions of the film base by stretching cannot be obtained with cellulose ester film. In fact the overall width dimension of acetate film loses between 8 to 15% from the casting step to winding of the product because of solvent loss.

Summary of the Invention

This invention provide a blend of a cellulose ester and up to 5% by weight of a polyesterether resin and to photographic film base prepared from same and having improved tear strength. The polyesterether is one having an I.V. of from about 0.8 to about 1.5, a melting point above about 150° C. and being the reaction product of (a) 100 mole percent of at least one aromatic or cycloaliphatic dicarboxylic acid having from 8 to 12 carbon atoms, (b) from about 75 to about 96 mole percent of an aliphatic or cycloaliphatic glycol having from about 2 to about 10 carbon atoms, and (c) from about 4 to about 25 mole percent of a polyether glycol having from 2 to 4 carbon atoms between ether oxygen atoms and a molecular weight of from about 200 to about 3,000. Such blends when prepare into film base, exhibit an increase in tear strength as much as 30% and nearly a 45% decrease in maximum shrinkage. Further, the tear strength of films prepared from such blends remains constant when stretched 20 to 30%. This is contrary to that of cellulose acetate film base without the presence of the polyesterether in that such films decrease exponentially as a function of stretch. Therefore, the output of any given film casting device can be greatly increased by permitting the stretching of the film and therefore an increase in the total area of film being produced.

Description of the Preferred Embodiments

The present invention provides an improved photographic film base from a blend of a cellulose ester and up to about 5 weight percent, based on the weight of the solids, the polyesterether described above. The polyesterether is utilized preferably in an amount from about 1 to 4% and most preferably in an amount of from about 1.5 to 2.5% by weight. Amounts greater than 5% by weight are unsuitable because solutions of the ingredients show signs of separation, require constant mixing up to the time of casting and the film base prepared having a greater concentration of the polyesterether exhibits and undesired amount of haze due to the incompatibility of the polymers.

Any suitable cellulose ester may be employed in the preparation of the blends and the film base in accordance with this invention such as for example the lower fatty acid esters of cellulose such as, cellulose acetates including, cellulose acetate, cellulose diacetate and cellulose triacetate, cellulose propionate, cellulose butyrate and mixtures of lower fatty acid esters of cellulose such as, cellulose acetate propionate, cellulose acetate butyrate, cellulose propionate butyrate and the like. Suitable cellulose esters are disclosed in U.S. Pat. No. 2,607,704 which is incorporated herein by reference. The polyesterether utilizes in accordance with this invention, in addition to having the characteristics in composition as set forth above include those prepared from aromatic or cycloaliphatic dicarboxylic acids having 8 to 12 carbon atoms useful in forming the elastomeric polyesterethers include terephthalic, isophthalic, naphthalene dicarboxylic, and 1,4-cyclohexane dicarboxylic acids, or combinations thereof.

Typical aliphatic or cycloaliphatic glycols having 2 to 10 carbon atoms useful in forming the copolyesterethers include those such as ethylene, propylene, 1,4-butanediol, neopentyl glycol 1,6-hexanediol, 1,4-cyclohexanedimethanol, and 1,5-pentanediol, combinations thereof and the like.

Typical useful polyether glycols having 2–4 carbon atoms between ether units include polytetramethylene ether glycol, polyethylene ether glycol, and polypropylene ether glycol and combinations thereof.

Typical useful commercially available polyether glycols include Carbowax resins, Pluronics resins, and Niax resins.

Conventional polymerization techniques well known to those skilled in the art, may be used in producing the polyesterethers used in this invention.

The preferred elastomer used to achieve enhanced tear strength is a copolyesterether described in U.S. Pat. No. 4,349,469, incorporated herein by reference. Basically this is a copolyesterether based on 1,4-cyclohexanedicarboxylic acid, 1,4-cyclohexanedimethanol, and polytetramethylene ether glycol. Other useful copolyesters include commercially available resins such as the Hytrel copolyesters manufactured by DuPont and the copolyesters such as the Galflex polymers manufactured by GAF.

The invention contemplates the physical blend of a cellulose ester polymer and a polyesterether polymer admixed in the proportion such that the polyesterether is present in a positive amount and an amount less than 5% by weight of the combination of the two polymers. Preferably, the polyesterether is present in an amount of from about 1% to about 4% by weight and most preferably in an amount from about 1.5 to 2.5% by weight. The two polymers may be ground together by any suitable technique employed in the art. Further, the ingredients in the correct proportions may be added to a suitable solvent or solvent mixtures in order to form a casting dope suitable for direct casting to form a film base. In this regard any suitable solvent or solvent combination may be employed such as for example, methylene chloride, methyl alcohol, cyclohexane, butyl alcohol, acetone, ethyl alcohol, methylethyl alcohol, methylethyl ketone, ethylene dichloride, hexane, mixtures thereof and the like. Additionally, as cellulose ester casting dopes are widely used in the preparation of film base, the polyesterether may be added directly to a previously prepared dope in order to achieve a film base casting dope in accordance with this invention.

The invention will be further illustrated by the following examples in which parts are by weight unless otherwise specified.

In the following examples, the cellulose ester is unplasticized cellulose triacetate containing 43.3% acetyl, 1% hydroxyl and having an intrinsic viscosity of about 2.2. The copolyesterether is a copolymer of 100 mole percent 1,4-cyclohexanedicarboxylic acid having a transisomer content of at least 70%, 91 mole percent of 1,4-cyclohexane dimethanol, and 9 mole percent of polytetramethyleneether glycol having a molecular weight of 1,000.

Example 1

Blends of cellulose triacetate in accordance with the above and hereinafter referred to as "CTA" and polyesterether in accordance with that described above, and hereinafter referred to as "PEE" were mixed in the following percentages: (a) 100% CTA (control); (b) 98% CTA-2% PEE; (c) 95% CTA-5% PEE; and (d) 90% CTA-10% PEE (control). Each of these compositions were dissolved in a solution of about 93% methylene chloride, 5% methyl alcohol and 2% butyl alcohol. Each of the solutions were then hand coated on a plate coater at a thickness of about 0.003 inch. The blend of 95% CTA-5% PEE showed signs of separation and required constant mixing until the time of casting. The 2% solution showed no signs of separation and the 10% solution showed an inordinate amount of separation which resulted in a film having unsatisfactory haze.

The control, containing no polyetherester and the compositions containing 2% and 5% PEE respectively were measured for tear strength with zero stretch. The results are shown in Table I.

TABLE I

| % PEE | Tear Strength (grams) |
|---|---|
| 0 (control) | 9.6 |
| 2 | 12 |
| 5 | 11 |

The control film (0% PEE) and the 2% containing composition were stretched at 20% and 30% and the tear strength measured. The 5% PEE film was stretched 20% stretch and measured for tear strength. The results of these tests are set forth in Table II.

TABLE II

| % PEE | % Stretch | Tear Strength (grams) |
|---|---|---|
| 0 | 20 | Failure |
| 0 | 30 | Failure |
| 2 | 20 | 12.5 |
| 2 | 30 | 11 |
| 5 | 20 | 10 |

It can be seen from the tables that cellulose triacetate cannot be stretched even at 20% without failure. Further, the tables clearly illustrate that both 2% addition of PEE and 5% addition of PEE permits stretching of the film with increase of tear strength under both stretch and no stretch conditions when compared to the control. Further, the addition of PEE to the cellulose triacetate in the proportions indicated, reduces the shrinkage of the film greatly thereby increasing the dimensional stability of the film in use. It is also readily seen from the table that the ability to stretch the film provides for a greater area of product being made and therefore an increase in efficiency.

What is claimed is:

1. A resinous film comprising
   (a) greater than 0 to about 5% by weight of a polyesterether having an I.V. of about 0.8 to about 1.5, a melting point above about 150° C. and being the reaction product of at least one aromatic or cycloaliphatic dicarboxylic acid having from about 8 to 12 carbon atoms and a glycol, the glycol comprising from about 75 to 96 mole percent of an aliphatic or cycloaliphatic glycol having from 8 to 12 carbon atoms, the balance being a polyether glycol having from 2 to 4 carbon atoms between ether oxygen atoms and a molecular weight of from about 200 to about 3,000 and
   (b) the balance being cellulose ester.

2. The film of claim 1 wherein the cellulose ester is cellulose acetate.

3. The blend of claim 2 wherein the cellulose acetate is cellulose triacetate.

4. The film of claim 1 wherein the polyesterether is the reaction product of 1,4-cyclohexane dicarboxylic acid, 1,4-cyclohexane dimethanol and polytetramethylene ether glycol.

* * * * *